United States Patent
King et al.

[11] Patent Number: 5,864,755
[45] Date of Patent: Jan. 26, 1999

[54] METHOD FOR ALLOWING A MOBILE PHONE TO RECEIVE A CALL THROUGH A WIRELESS NETWORK FOR WHICH IT IS NOT REGISTERED, FOR EMERGENCY PURPOSES

[75] Inventors: Neal J. King, Oakland, Calif.; Markku Korpi, Starnberg, Germany; Günter Kleindl, Ybbs/Donau; Ernst Horvath, Vienna, both of Austria; Wilhelm Mueller, Woerth, Germany

[73] Assignee: Siemens Business Communication Systems, Inc., Santa Clara, Calif.

[21] Appl. No.: 662,568

[22] Filed: Jun. 11, 1996

[51] Int. Cl.[6] ...................................................... H04Q 7/22
[52] U.S. Cl. ........................ 455/404; 455/433; 455/435; 379/37
[58] Field of Search ................................. 379/37, 45, 46, 379/127, 156, 157; 455/31.2, 403, 404, 415, 417, 433, 456, 457, 435

[56] References Cited

U.S. PATENT DOCUMENTS

| | | | |
|---|---|---|---|
| 5,465,388 | 11/1995 | Zicker | 455/404 |
| 5,475,744 | 12/1995 | Ikeda | 379/127 |
| 5,537,457 | 7/1996 | Lantto et al. | 455/433 |
| 5,563,931 | 10/1996 | Bishop et al. | 455/404 |
| 5,604,795 | 2/1997 | Saito | 379/100.12 |
| 5,689,548 | 11/1997 | Maupin et al. | 455/404 |

Primary Examiner—Edward F. Urban
Assistant Examiner—Thuan T. Nguyen

[57] ABSTRACT

A method for operating a wireless telephone system to provide emergency service for a wireless telephone operating in the wireless telephone system. In the present invention, the wireless telephone system receives a request to connect the wireless phone to a predetermined telephone number from the wireless telephone. The telephone system then queries the wireless telephone for a unique identifying number identifying the wireless telephone. The unique identifying number enables the wireless telephone system to connect the wireless telephone to the wireless telephone system. The wireless telephone system maintains a set of direct inward dialing numbers (DIDs) that are used exclusively for emergency calls. Each of the DID allows a caller outside of the wireless telephone system to direct a call to a telephone within the wireless telephone system. The emergency call is assigned one of these DIDs and that DID is linked to the unique identifying number of the telephone placing the emergency call. The wireless telephone is then connected to an emergency operator and the emergency operator is given the assigned DID. The DID enables a call from the emergency operator to the wireless telephone through the wireless telephone system. In one embodiment of the present invention, the DID assigned to the wireless telephone also identifies the antenna closest to the wireless telephone. The assignment between the DID and the unique identifying number is terminated after a predetermined period of time which may be altered by the caller or those servicing the emergency call.

8 Claims, 1 Drawing Sheet

METHOD FOR ALLOWING A MOBILE PHONE TO RECEIVE A CALL THROUGH A WIRELESS NETWORK FOR WHICH IT IS NOT REGISTERED, FOR EMERGENCY PURPOSES

FIELD OF THE INVENTION

The present invention relates to telecommunications, and more particularly, to wireless telephone systems such as cellular phones and wireless private branch exchanges (PBX).

BACKGROUND OF THE INVENTION

Wireless phone systems are commonly used in PBX serviced areas as well as in the public cellular phone system. Wireless voice systems are designed to allow only registered mobile phones to originate-and receive calls. This presents a problem when the user must make an emergency call while traveling in an area which is serviced by a phone system in which the user is not registered. Current protocols in some wireless voice systems (e.g., DECT systems) allow an unregistered mobile phone to make a call if the call is designated as an "emergency call". However, current protocols do not allow an unregistered mobile phone to receive a call for any reason.

When an emergency call is received by a telephone system, it is typically forwarded to an Emergency Service Answering Point (ESAP) where a specially trained operator handles the call. If the ESAP loses the connection to the caller, the ESAP may not be able to provide emergency service without re-establishing the telephone link. If the call was placed from the public switched telephone network (PSTN), the emergency operator receives the number of the telephone making the call from the telephone system, and hence, can call the party back to continue the call. Furthermore, the emergency operator can determine the location from which the call was made since the telephone number is associated with a unique geographical location.

Such call backs are not possible with current wireless systems since an unregistered telephone does not have a phone number in the system. In public cellular systems, the limited amount of information that can be transferred to the ESAP forces further compromises usefulness. In these systems, the location of the caller is deemed to be more important than a call-back number. Since the systems are set up to transfer only a single identifying number, the cellular systems transfer a number identifying the antenna on which the call was received. This provides some localization of the user; however, this location information is, typically, limited to localization within a few miles. If the call was transferred to another antenna because of congestion at the closest antenna, this localization information is even less useful.

Broadly, it is the object of the present invention to provide an improved wireless telephone system.

It is a further object of the present invention to provide a wireless telephone system in which an unregistered telephone can make an emergency call and receive a call back from an emergency operator.

It is yet another object of the present invention to provide a wireless telephone system in which the emergency operator can receive both location and call-back information.

These and other objects of the present invention will become apparent to those skilled in the art from the following detailed description of the invention and the accompanying drawings.

SUMMARY OF THE INVENTION

The present invention is a method for operating a wireless telephone system to provide emergency service for a wireless telephone operating in the wireless telephone system. In the present invention, the wireless telephone system receives a request to connect the wireless phone to a predetermined telephone number from the wireless telephone. The telephone system then queries the wireless telephone for a unique identifying number identifying the wireless telephone. The unique identifying number enables the wireless telephone system to connect the mobile telephone to the wireless telephone system. The wireless telephone system maintains a set of direct inward dialing numbers (DIDs) that are used exclusively for emergency calls. Each of the DIDs allows a caller outside of the wireless telephone system to direct a call to a telephone within the wireless telephone system. These DIDs are preferably registered with the PSTN. The emergency call is assigned one of these DIDs and that DID is linked to the unique identifying number of the telephone placing the emergency call. The wireless telephone is then connected to an emergency operator and the emergency operator is given the assigned DID. The DID enables a call from the emergency operator to the wireless telephone through the wireless telephone system. In one embodiment of the present invention, the DID assigned to the wireless telephone also identifies the antenna closest to the wireless telephone. In one embodiment of the present invention, the assignment between the DID and the unique identifying number is terminated after a predetermined period of time. The time period can be extended by the caller or by someone servicing the emergency call by connecting a new call to the wireless telephone using the assigned DID. The operator servicing the emergency call can also terminate the assignment by sending an appropriate command to the wireless telephone system.

DETAILED DESCRIPTION OF THE INVENTION

For the purposes of this discussion, the term "registered" means that the mobile phone has two elements associated with it. First, the mobile phone must be technically compatible with the wireless voice system. Technical compatibility requires that the mobile phone operate on the same radio frequencies and use the same interface protocols as other mobile phones in the wireless system.

Second, the mobile phone must have a previously agreed-upon identification by which it can establish communication with the system to originate calls, and a previously agreed-upon phone number by which calls can be directed to it. Most wireless telephones used in PBX and cellular phone systems have a unique identification number programmed into the units. For example, for DECT mobile phones, this is referred to as the International Portable User Identity type N (IPUI N). The call-in number is typically a number which a user of the PSTN can use to contact the mobile telephone. The switch system maintains a database which links the PSTN number and IPUI N.

The present invention allows a phone that has the first element of registration, i.e., is technically compatible with the phone system receiving the call, to establish a temporary registration in that phone system for the purposes of placing an emergency call and receiving a call back whether or not the phone is registered in the wireless telephone system.

Figure 1:
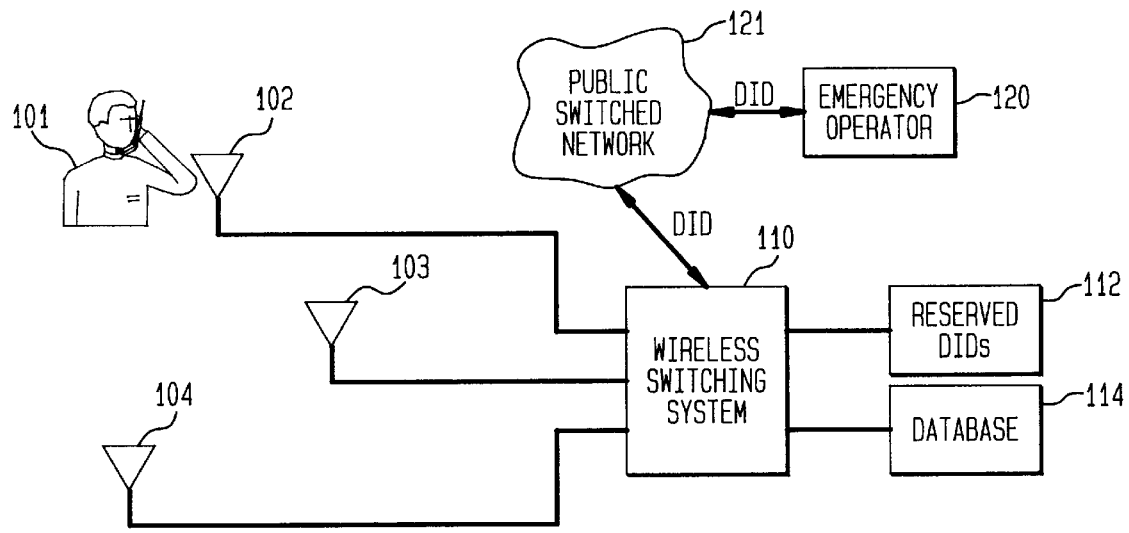
FIG. 1 is a schematic drawing of a caller making an emergency telephone call in a wireless telephone system according to the present invention.

Refer now to FIG. 1 which is a schematic drawing of a wireless system in which a user of the system is placing an emergency phone call on the user's mobile phone 101. The wireless system shown in FIG. 1 includes a plurality of antennae shown at 102–104 which are connected to a central switching system 110. In a wireless telephone system according to the present invention, the wireless system maintains one or more Direct Inward Dial (DID) phone numbers in a table 112. These numbers are preferably registered with the PSTN 121. These DIDs are reserved for incoming emergency calls. These DID phone numbers are never used to identify any originated non-"911" calls, nor are these phone numbers intended to receive non-emergency calls. Ordinarily, these phone numbers are not assigned to any phone.

In the preferred embodiment of the present invention, all emergency calls are handled in the same manner independent of whether or not the originating mobile phone is registered. The mobile phone is assigned one of the reserved DIDs for a specified period of time. In effect, even an unregistered phone becomes registered in the system for the limited purpose of sending emergency calls and receiving call backs. The system also obtains the mobile phone's unique identifier by interrogating the mobile phone which, for example, for DECT equipment, returns its IPU N in response to the interrogation. The mobile system links the assigned DID and unique identifier in the appropriate data base 114. The assigned DID is transmitted via Automatic Number Identification (ANI) to the ESAP 120. The link remains in effect for a defined period of time which is sufficient to allow the ESAP to process the emergency and send help. If a call arrives at the mobile system for this DID, the mobile system sets up a call to the mobile phone using its unique identifier. During the period in which the DID remains assigned, only emergency calls from the mobile phone will be accepted by the mobile system. All such emergency calls will be assigned the same DID. Each time an emergency call is placed by the mobile phone, the assignment will be extended by the same time period. Finally, when the redefined time period expires, the mobile system dissolves the link between the DID and the unique identifier of the mobile phone.

In one preferred embodiment of the present invention, the reserved DIDs are assigned to emergency calls by the antenna that is closest to the emergency caller. Normally, this will be the antenna on which the emergency call is being received and which is assigned by the wireless phone system to handle the call. In some cases, however, the closest antenna may not have sufficient capacity to handle the call because of other calls currently in progress through that antenna. In this case, the call will be assigned to another nearby antenna. However, the DID will still be one corresponding to the closest antenna.

In the example shown in FIG. 1, the caller is closest to antenna 102 which is assigned by the central switch system to provide the link to mobile phone 101. Hence, the DID assigned to the emergency call corresponds to antenna 102. Given a DID, an emergency operator with the aid of the appropriate database can determine the location of that antenna. Hence, this embodiment of the present invention provides the emergency operator with both a call-back number and location information. In this preferred embodiment of the present invention, the DID always identifies the closest antenna to the caller. That is, if the call is switched to a more distant antenna because of congestion at the closest antenna, the assigned DID will still be one of those associated with the closest antenna.

As noted above, the DID remains assigned to the mobile phone for some predetermined period of time. In the preferred embodiment of the present invention, this time period may be overridden by the emergency operator or by the receipt of a call back using the DID. In principle, the link should remain for a period of time that is sufficient for help to arrive at the scene of the emergency. However, given the limited number of emergency DIDs, it is important that a DID be released as soon as possible.

In some cases, the emergency operator can determine that no further communication is necessary. For example, an emergency call that reports an emergency that is already being serviced in response to a prior call from another party needs no further service, and hence, can be disconnected immediately. Similarly, as soon as help arrives on the scene, the link can be dissolved if the responding emergency team has its own communication system. In the preferred embodiment of the present invention, the emergency operator can release the DID by sending an appropriate command to the wireless switching system.

If help is slow arriving at the scene, it is important that the link remain intact even if the time period exceeds the predetermined default time period. In the preferred embodiment of the present invention, the predetermined period is measured from the termination of the last call on that link. Hence, either the party making the 911 call, the operator, or the responding emergency team can extend the time period by making another call using the link.

A mobile phone according to the present invention recognizes an emergency call. A special button may be supplied on the phone. Alternatively, the phone recognizes a call to "911". When the phone detects an emergency outgoing call, the phone enters an emergency state in which it carries out the following sequence.

Figure 2:
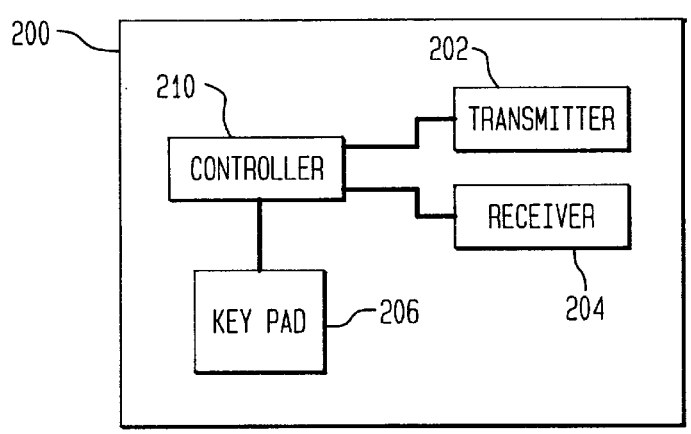
FIG. 2 is a block diagram of a mobile phone according to the present invention.

Refer now to FIG. 2 which is a block diagram of a mobile phone according to the present invention. Mobile phone 200 is similar to conventional mobile phones in that it includes a transmitter 202 and receiver 204 for sending and receiving radio signals in a predetermined frequency band. Mobile phone 200 also includes a key pad 206 for receiving input from the user thereof For example, key pad 206 is used to enter phone numbers to call. The coordination of the various elements of mobile phone 200 is carried out by a microprocessor based controller 210. In the preferred embodiment of the present invention, the features discussed herein are implemented by altering the programming of controller 210.

First, the mobile phone scans the broadcast bands for all technically compatible wireless systems. If it can establish communication with any system, it will request an emergency call and commence call set-up. The mobile phone will provide its unique identifier to the system upon interrogation. During the course of the call, the mobile phone adheres to the emergency call convention that it cannot hang up. Hence, the mobile phone will not transmit a call-termination command unless it receives one first from the wireless system.

After the call, the mobile phone will remain synchronized to the wireless system for the predetermined time period. During this period, a new call to "911" will reset the timer. If powered is turned off on the phone, it will return to synchronization with the wireless system if the power is turned on during this period. After the time period expires, the mobile phone will return to its normal status.

In some emergency situations, the mobile unit will be moving while it is making the emergency phone call. For example, the call could be made from an automobile that is transporting a person to a hospital. In this situation, there is a danger that the mobile phone might move outside the range of the original wireless system before the expiration of the emergency time interval described above. In one embodiment of the present invention, this problem is overcome by the mobile unit detecting the loss of communication with the wireless system. When such a loss is detected, the mobile system places another emergency telephone call which will be received by the wireless system servicing the geographic area into which the mobile unit has moved.

Various modifications to the present invention will become apparent to those skilled in the art from the foregoing description and accompanying drawings. Accordingly, the present invention is to be limited solely by the scope of the following claims.

What is claimed is:

1. A method for operating a wireless telephone system to provide emergency service for a wireless telephone operating in said wireless telephone system, said method comprising the steps of: receiving a request to connect said wireless phone to a predetermined telephone number from said wireless telephone;

receiving a unique identifying number identifying said wireless telephone, said unique identifying number enabling said wireless telephone system to connect said mobile telephone to said wireless telephone system;

storing a plurality of direct inward dialing numbers (DIDs) that are used exclusively for emergency calls, each said DID allowing a caller outside of said wireless telephone system to call a telephone within said wireless telephone system;

assigning one of said DIDs to said unique identifying number;

connecting said wireless telephone to an emergency operator and providing said emergency operator with said assigned DID, said DID enabling a call from said emergency operator to said wireless telephone through said wireless telephone system.

2. The method of claim 1 wherein said wireless telephone system comprises a plurality of antennae, and wherein said assigned DID identifies one of said antennae, said identified antenna being the antenna closest to said wireless telephone.

3. The method of claim 1 wherein said DIDs are registered with PSTN.

4. The method of claim 3 wherein said assigned DID becomes unassigned after a predetermined time period has expired.

5. The method of claim 4 wherein said predetermined time period is reset each time a call is placed from said wireless telephone to said emergency operator or to said wireless telephone using said assigned DID.

6. A wireless telephone adapted for use in a wireless telephone system, said wireless telephone comprising:

dialing means for receiving a telephone number from a user of said wireless telephone, said telephone number defining a party to be called, said dialing means comprising means for identifying an emergency call;

emergency call means responsive to said dialing means identifying an emergency call for scanning all frequency bands in which said wireless telephone can communicate with a wireless telephone system which is compatible with said wireless telephone;

means responsive to said emergency call means detecting a compatible wireless telephone system for establishing an emergency call link with said wireless telephone system;

means for storing a code uniquely identifying said wireless telephone and for transmitting said code to said wireless telephone system in response to a command from said wireless telephone system;

timer means being triggered by said emergency call, defining a time period during which said wireless telephone remains synchronized with said wireless telephone system.

7. The wireless telephone of claim 6 further comprising means for detecting a loss of said emergency call link and means, responsive to said detecting means detecting said loss, for causing said emergency call means to attempt to establish another emergency call link with a second wireless telephone system.

8. The wireless telephone of claim 6, wherein said timer means keeps operating after turnoff of the wireless telephone and if said wireless telephone is turned on during said time period, initiating synchronization with said wireless telephone system.

* * * * *